(12) United States Patent
Blaner et al.

(10) Patent No.: US 7,849,293 B2
(45) Date of Patent: Dec. 7, 2010

(54) METHOD AND STRUCTURE FOR LOW LATENCY LOAD-TAGGED POINTER INSTRUCTION FOR COMPUTER MICROARCHITECHTURE

(75) Inventors: Bartholomew Blaner, Underhill Center, VT (US); Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/023,791

(22) Filed: Jan. 31, 2008

(65) Prior Publication Data

US 2009/0198967 A1 Aug. 6, 2009

(51) Int. Cl.
*G06F 9/44* (2006.01)
*G06F 9/312* (2006.01)
(52) U.S. Cl. ....................... 712/220; 712/224
(58) Field of Classification Search ............ 712/224, 712/220
See application file for complete search history.

(56) References Cited

U.S. PATENT DOCUMENTS

| | | | | |
|---|---|---|---|---|
| 4,241,396 A | * | 12/1980 | Mitchell et al. | 711/154 |
| 5,889,986 A | * | 3/1999 | Nguyen et al. | 712/237 |
| 7,003,768 B2 | * | 2/2006 | Daynes et al. | 718/1 |

* cited by examiner

*Primary Examiner*—Daniel Pan
(74) *Attorney, Agent, or Firm*—Michael J. LeStrange

(57) ABSTRACT

A methodology and implementation of a load-tagged pointer instruction for RISC based microarchitecture is presented. A first lower latency, speculative implementation reduces overall throughput latency for a microprocessor system by estimating the results of a particular instruction and confirming the integrity of the estimate a little slower than the normal instruction execution latency. A second higher latency, non-speculative implementation that always produces correct results is invoked by the first when the first guesses incorrectly. The methodologies and structures disclosed herein are intended to be combined with predictive techniques for instruction processing to ultimately improve processing throughput.

36 Claims, 6 Drawing Sheets ltptr    RT,DQ(RA),EPT

| 57 | RT | RA | DQ | EPT | 1 |
|---|---|---|---|---|---|
| 0 | 8 | 11 | 18 | 28 | 30   31 |

This instruction uses a DECODE function
y= DECODE (x) defined by:

x    y
   00   1000
   01   0100
   10   0010
   11   0001 and a DECODE1 function
y = DECODE1 (x) defined by:

x    y
   00   0010
   01   0100
   10   0110
   11   1000 if RA = 0 then b ← 0
else      b ← (RA)
EA ← b +$_{tea}$ EXTS [DQ || 0b0000]
pt ← DECODE1 (EPT)
if ( (DECODE (MEM$_{Qs1}$ (EA,1) & pt) = 0b0000) &
  ( MEM$_2$ (EA,1) = 0) & (MEM$_{tsg}$ (EA) = 1)
then RT   MEM(EA=8, 8)
else RT ← 0
XER$_{11:43}$ ← undefined

FIG. 1

METHOD AND STRUCTURE FOR LOW LATENCY LOAD-TAGGED POINTER INSTRUCTION FOR COMPUTER MICROARCHITECHTURE

FIELD OF THE INVENTION

The field of invention relates generally to a mechanism for speculatively executing instructions in a central processing unit to increase overall processing throughput by testing whether certain instruction processing dependencies are satisfied, such as whether a memory address tag is valid, prior to completion of the instruction. The invention relates more particularly to a method and structure for an instruction loading a tagged pointer, wherein a speculative result for an executing instruction is obtained and checked for accuracy and, if the prediction is invalid, a second non-speculative load tagged pointer instruction is issued.

BACKGROUND OF THE INVENTION

The speculative execution of instructions in microprocessors is beneficial in improving system performance. A state-of-the-art microprocessor typically includes an instruction cache for storing instructions, one or more execution units for executing sequential instructions, a branch unit for executing branch instructions, instruction sequencing logic for routing instructions to the various execution units, and registers for storing operands and result data.

An application program for execution on a microprocessor includes a structured series of macro instructions that are stored in sequential locations in memory. A current instruction pointer within the microprocessor points to the address of the instruction currently being executed, and a next instruction pointer within the microprocessor points to the address of the next instruction for execution. During each clock cycle, the length of the current instruction is added to the contents of the current instruction pointer to form a pointer to a next sequential instruction in memory. The pointer to the next sequential instruction is provided to logic that updates the next instruction pointer. If the logic determines that the next sequential instruction is indeed required for execution, then the next instruction pointer is updated with the pointer to the next sequential instruction in memory. Thus, macro instructions are fetched from memory in sequence for execution by the microprocessor.

Since a microprocessor is designed to execute instructions from memory in the sequence they are stored, it follows that a program configured to execute macro instructions sequentially from memory is one which will run efficiently on the microprocessor. For this reason, most application programs are designed to minimize the number of instances where macro instructions are executed out of sequence. These out-of-sequence instances are known as jumps or branches.

A program branch presents a problem because most conventional microprocessors do not simply execute one instruction at a time. Modern microprocessors typically implement a number of pipeline stages, each stage performing a specific function. Instructions, inputs, and results from one stage to the next are passed in synchronization with a pipeline clock. Hence, several instructions may be executing in different stages of the microprocessor pipeline within the same clock cycle. As a result, when logic within a given stage determines that a program branch is to occur, then previous stages of the pipeline, that is, stages that are executing instructions following in sequence, must be cast out to begin execution of sequential macro instructions beginning with the instruction directed to by the branch, or the branch target instruction. This casting out of previous pipeline stages is known as flushing and refilling the pipeline.

Branch instructions executed by the branch unit of the processor can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch in program flow specified by an unconditional branch instruction is always taken. In contrast, conditional branch instructions are branch instructions for which the indicated branch in program flow may or may not be taken, depending upon a condition within the processor, for example, the state of a specified condition register bit or the value of a counter.

A conditional branch is a branch that may or may not occur, depending upon an evaluation of some specified condition. This evaluation is typically performed in later stages of the microprocessor pipeline. To preclude wasting many clock cycles associated with flushing and refilling the pipeline, present day microprocessors also provide logic in an early pipeline stage that predicts whether a conditional branch will occur or not. If it is predicted that a conditional branch will occur, then only those instructions prior to the early pipeline stage must be flushed, including those in the instruction buffer. Even so, this is a drastic improvement, as correctly predicted branches are executed in roughly two clock cycles. However, an incorrect prediction takes many more cycles to execute than if no branch prediction mechanism had been provided in the first place. The accuracy of branch predictions in a pipeline processor therefore significantly impacts processor performance.

Yet, present day branch prediction techniques chiefly predict the outcome of a given conditional branch instruction in an application program based upon outcomes obtained when the conditional branch instruction was previously executed within the same instance of the application program. Historical branch prediction, or dynamic branch prediction, is somewhat effective because conditional branch instructions tend to exhibit repetitive outcome patterns when executed within an application program. The historical outcome data is stored in a branch history table that is accessed using the address of a conditional branch instruction (a unique identifier for the instruction). A corresponding entry in the branch history table contains the historical outcome data associated with the conditional branch instruction. A dynamic prediction of the outcome of the conditional branch instruction is made based upon the contents of the corresponding entry in the branch history table.

However, since most microprocessors have address ranges on the order of gigabytes, it is not practical for a branch history table to be as large as the microprocessor's address range. Because of this, smaller branch history tables are provided, on the order of kilobytes, and only low order bits of a conditional branch address are used as an index into the table. This presents another problem. Because low order address bits are used to index the branch history table, two or more conditional branch instructions can index the same entry. This is known as an alias or synonym address. As such, the outcome of a more recently executed conditional branch instruction will replace the outcome of a formerly executed conditional branch instruction that is aliased to the same table entry. If the former conditional branch instruction is encountered again, its historical outcome information is unavailable to be used for a dynamic prediction.

Because dynamic predictions are sometimes not available, an alternative prediction is made for the outcome of a conditional branch instruction, usually based solely upon some static attribute of the instruction, such as the relative direction of a branch target instruction as compared to the address of the conditional branch instruction. This alternative prediction is called a static prediction because it is not based upon a changing execution environment within an application program. The static branch prediction is most often used as a fallback in lieu of a dynamic prediction. Hence, when a dynamic prediction is unavailable, the static prediction is used.

As described above, prediction techniques can cover a wide range. On one end of the spectrum are simple static prediction techniques, such as cases where overflow is usually not present or the usual case does not raise an exception. To improve predictive accuracy, advanced dynamic predictors have been developed, including, one bit predictors, bimodal predictors, gshare predictors, gskew predictors, and tournament predictors. Such advanced predictors are usually employed in conjunction with branch prediction.

Speculative execution is a performance optimization. It is only useful when speculative execution consumes less time than non-speculative execution would, and the net savings sufficiently compensates for the possible time wasted computing a value which is never used, discarding that value, and recomputing the value non-speculatively.

While predictive techniques have been successfully applied to branch prediction, other instruction types, including tagged pointer loads, have thus far not benefited from the use of such advanced predictors. There is thus a need for efficiently and accurately predicting the execution behavior of different types of instructions and exploiting such predictions to improve instruction execution performance.

A tagged architecture is a hardware implementation where each memory word is segmented into a data and "tagged" section. The data section is large enough to accommodate a memory address and the tagged section is an encoded representation of the data type. All load instructions executed by an application code must perform a tag verification operation. In prior art, this requirement diminished load instruction performance relative to a non-tagged architecture. Since load instructions may comprise up to 30% of issued instructions, if each load experiences increased latency, overall performance can be significantly diminished.

Tagged architectures can simplify hardware design and facilitate software development. With tagging, a data word could represent an indexed array descriptor, an indirect reference word, or a program control word. Any reference to a variable could automatically redirect processing, provide an index into an array, or initiate a subroutine and pick up a returned value that was left on the stack.

The virtual memory system in most modern operating systems reserves a block of logical memory around address 0x00000000 as unusable. This means that, for example, a pointer to 0x00000000 is never a valid pointer and can be used as a special null pointer value to indicate an invalid pointer.

Pointers to certain types of data will often be aligned with the size of the data (4 bytes, 8 bytes, etc.), which may leave a few bits of the pointer unused. As long as the pointer properly masks out these bits, the pointer can be tagged with extra information.

Taking advantage of the alignment of pointers provides more flexibility because it allows pointers to be tagged with information about the type of data pointed to, conditions under which it may be accessed, or other similar information about the pointer's use. This information can be provided along with every valid pointer. In contrast, null pointers and sentinels provide only a finite number of tagged values distinct from valid pointers.

The major advantage of tagged pointers is that they take up less space than a pointer along with a separate tag field. This can be especially important when a pointer is a return value from a function or part of a large table of pointers.

A more subtle advantage is that by storing a tag in the same place as the pointer, it is often possible for an operating system to significantly improve performance because the tag allows the data type to be recognized or interpreted more quickly. Furthermore, tagging pointers increases system stability and security, by avoiding data corruption by detecting when the processor atemots to use a data words which are not tagged as pointers to access memory due to a program error, or an unallowed data access attempt.

The Load Tagged Pointer (ltptr) instruction was defined for the IBM iSeries processor architecture (PowerPC AS, also known as AS/400) to improve performance when operating on tagged pointers in certain important OS/400 (iSeries operating system) environments. A tagged pointer handling apparatus is explained in detail in commonly assigned U.S. Pat. No. 4,241,396, herein incorporated by reference. In accordance with this apparatus, an ltptr instruction loads a pointer from a specified address if an associated tag indicates the memory location to hold a valid address, and an associated specifier matches the expected pointer specifier. Otherwise, if the specified storage location either does not have a tag indicating a valid pointer, or the pointer specifier is not matched, a NULL address is loaded to the target register. The LTPTR instruction advantageously eliminates a sequence of prior tag testing instructions with a single instruction. The performance objective for ltptr was to have it ultimately execute with the same load-use latency as the Load Doubleword (ld) instruction, which has proven difficult to achieve.

SUMMARY

A methodology and implementation of a load-tagged pointer instruction for RISC based microarchitecture is presented. A first lower latency, speculative implementation reduces overall throughput latency for a microprocessor system by estimating the results of a particular instruction and confirming the integrity of the estimate. A second higher latency, non-speculative implementation that always produces correct results is invoked by the first when the first guesses incorrectly. The methodologies and structures disclosed herein are intended to be combined with predictive techniques for instruction processing to ultimately improve processing throughput.

According to a first exemplary embodiment, a method and structure is provided for implementing a load tagged-pointer ("ltptr") instruction with a load-use latency of five clock cycles. The method includes "cracking" or decomposing a ltptr macro instruction into three internal operations ("IOPS") and executing them independently. The first IOP loads a doubleword from the effective address of a specified memory location into a scratch general purpose register ("GPR") in the fifth cycle and in the sixth cycle loads the tag portion of the effective address specified into a fixed point exception register (XER) and zeroes out bits 41 and 42 of the XER. The second IOP issues during the second clock cycle and loads another doubleword from the effective address plus an offset into the destination register of the ltptr instruction. The third IOP copies the target register specified for the ltptr instruction back to itself if the pointer is valid, otherwise the target register is zero loaded. The five cycle load latency embodiment accepts the penalty associated without having to discard intermediate results of an instruction dependent upon the ltptr instruction.

According to a second exemplary embodiment, a method and structure is provided to implement a speculative ltptr instruction provided for implementing a load tagged-pointer ("ltptr") instruction with a load-use latency of two clock cycles. The second embodiment exploits the fact that the ltptr seldom returns a null pointer. Similar to the first embodiment, the method includes "cracking" or decomposing a ltptr macro instruction into three internal operations ("iop") and executing them independently. In the case of the first two iops, however, the order of execution is interchanged so that data returned from the LQ2ND iop may be provided at the earliest possible time. Although it is assumed the LQ2ND iop result will correspond to the outcome of the LTPTR loading a valid pointer, the hardware must report an exception and respond correctively when an invalid pointer is detected and a null pointer should have been returned.

BRIEF DESCRIPTION OF THE DRAWINGS

Referring to the exemplary drawings wherein like elements are numbered alike in the several Figures:

FIG. 1 illustrates a definition of the ltptr instruction encoded in DQE instruction format.

DETAILED DESCRIPTION

FIG. 1 illustrates the instruction encoding of an ltptr instruction for the PowerPC instruction set architecture using the DQE instruction format of the PowerPC instruction set, i.e., an instruction with a quad displacement field (DQ) and a pointer specifier EPT is specified that is used for checking the expected pointer format. An if statement evaluates whether the pointer is null or valid. Bits 0:1 of the first argument for the decode function represent the first two bits of the data stored at the address specified by EA and are used to decode y=DECODE(x). The decoded y function is logically ANDed with the value pt, which is derived from the EPT field of the PowerPC instruction according to y=DECODE1(x), where x=EPT. The results of the second decode function are then loaded into pt and compared with 0b0000. The second part of the if statement (MEM[2] (EA, 1)=0) tests whether bit 2 of the byte fetched from EA is zero. The third part (MEM[tag] (EA)=1) tests whether the tag bit associated with EA equals one. If the logical AND of the first three clauses returns a logic '1', then the quadword at EA represents a valid pointer and the target register is loaded with the doubleword from the memory address specified by EA+8. If the logical AND of the first three clauses returns zero, then the target register is loaded with zeroes to represent an invalid (null) pointer.

In sum, bits from the doubleword at EA and the tag bit together with bits in the instruction qualify the doubleword at EA+8 as a valid pointer.

In accordance with an aspect of the definition of the LTPTR instruction in one embodiment, all memory accesses are performed as a single atomic access with respect to other accesses in the system, wherein accessing atomically means that an instruction consisting of more than one individual operation is carried out completely, without interruption for any other operation.

Figure 2:
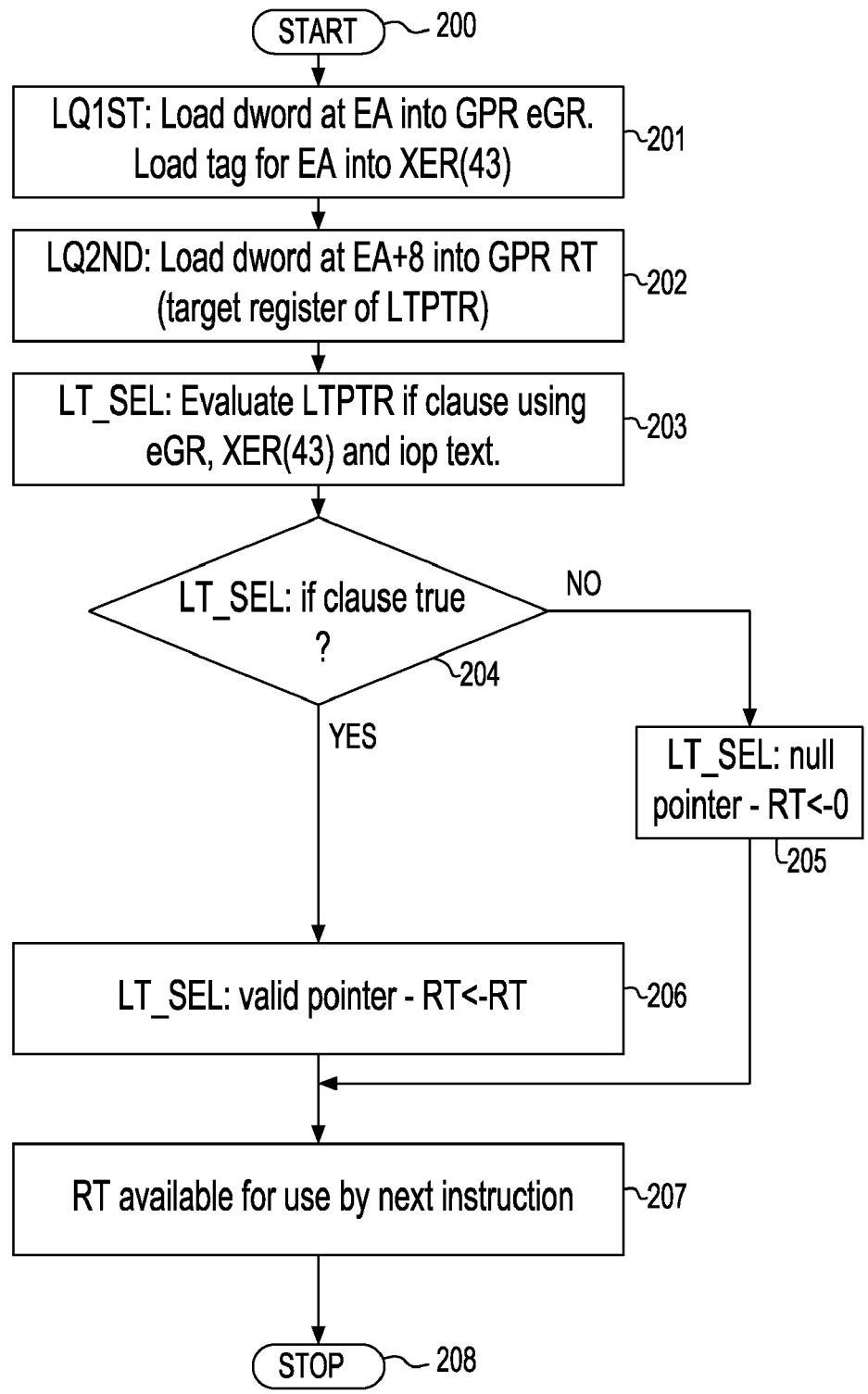
FIG. 2 depicts a logical flow of a five-cycle load-use latency of a non-speculative ltptr instruction according to an exemplary embodiment.

Referring to FIG. 2, a methodology is shown for processing a load tagged pointer (ltptr) instruction according to an exemplary embodiment. The ltptr methodology 200 trades reduced hardware complexity for higher execution latency by implementing a 5-cycle load-use latency—meaning there is a lag of five cycle between when data is loaded and when it may be considered valid for use in further processing. The ltptr instruction is cracked into three separate internal operations (iops): LQ1ST, LQ2ND and LT_SEL. The first iop 201 loads the doubleword from memory at the effective address into a scratch general purpose register, eGR, while the tag bit associated with the effective address is loaded into bit location 43 of fixed point exception register, XER. The second iop 202 loads a second double word from the next successive byte locations of the effective address into general purpose register RT, the target register for the ltptr instruction. The third iop 203 evaluates whether the pointer is valid or not, using the if statement shown in FIG. 1, and at step 206 writes the previously loaded pointer value of step 202 to the ltptr target register if XER(43)=1, otherwise a zero is written at step 205 to the ltptr target register, RT. In other words, RT is loaded with either the address contents of the tagged pointer or zero if the pointer is invalid.

Figure 3:
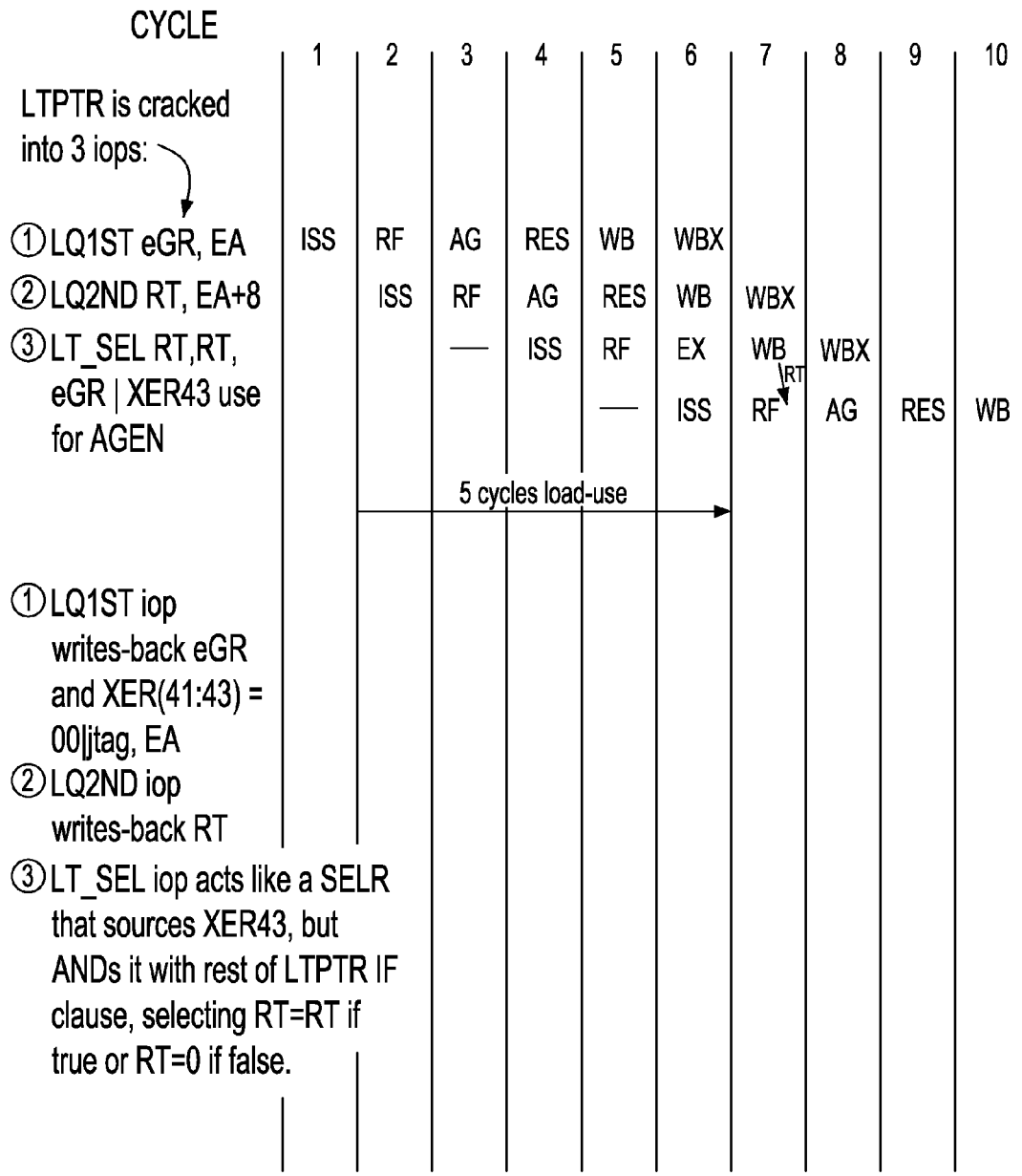
FIG. 3 illustrates an instruction pipeline sequence corresponding to the non-speculative ltptr instruction shown in FIG. 2.

Referring to FIG. 3, operations occurring during each cycle of the execution of the ltptr instruction with 5-cycle load-use latency are shown. After the instruction decode logic has cracked the ltptr instruction into three iops, the LQ1ST iop issues in the first cycle (ISS).

In the second cycle, general purpose file register access (RF) occurs reading the source operands for the effective address (EA) calculation from the GPR. Concurrent with the RF operation the LQ2ND iop issues.

In the third cycle, with respect to LQ1ST, storage address generation AG occurs using source operands from the GPR generating EA. Also in the third cycle GPR access RF is processed reading the source operands for the EA+8 calculation.

In the fourth cycle, iop LQ1ST the doubleword from EA and the associated tag bit results (RES) are returned from storage to the fixed point (FXU) for write back to the GPR. The LQ2ND iop executes storage address generation AG in the fourth cycle generating EA+8 for the doubleword pointer in the fifth cycle. The third iop, LT_SEL also issues in the fourth cycle.

In the fifth cycle, iop LQ1ST writes back the doubleword fetched from EA into scratch general purpose register, eGR, while iop LQ2ND returns (RES) the doubleword from EA+8 to the fixed point unit. GPR and XER access RF is also processed in the fifth cycle for iop LT_SEL, providing the contents of eGR, RT, and XER(43) for testing whether the if statement is true and copying back the contents of RT to itself if it is indeed true.

In the sixth cycle, iop LQ1ST writes back the tag bit to fixed point exception register XER thereby completing execution for the LQ1ST IOP. LQ2ND IOP also writes back the doubleword pointer read from storage address EA+8 to make it available to the third IOP, LT_SEL. Finally, LT_SEL evaluates the if statement from step 204 of FIG. 2, using the data and tag fetched from storage in the fourth cycle RES operation for LQ1ST.

In the seventh cycle, LQ2ND writes back WB to the GPR RT either the contents read from RT in the fifth cycle LT_SEL if the if statement is true (valid pointer) or a 0 (null pointer) if the if statement is false.

In accordance with one aspect of the implementation of the LTPTR instruction and tagged pointer uses in at least one embodiment, accesses to a first and second memory doubleword at addresses EA and EA+8, respectively, are performed as a single atomic transaction with respect to other memory operations in the system.

Because there is a dependency between iops 201, 202 and 203, the overall latency of the computation corresponds to the pipelined execution of the dependent sequence of instructions 1, 2 and 3 of FIG. 3.

Figure 4:
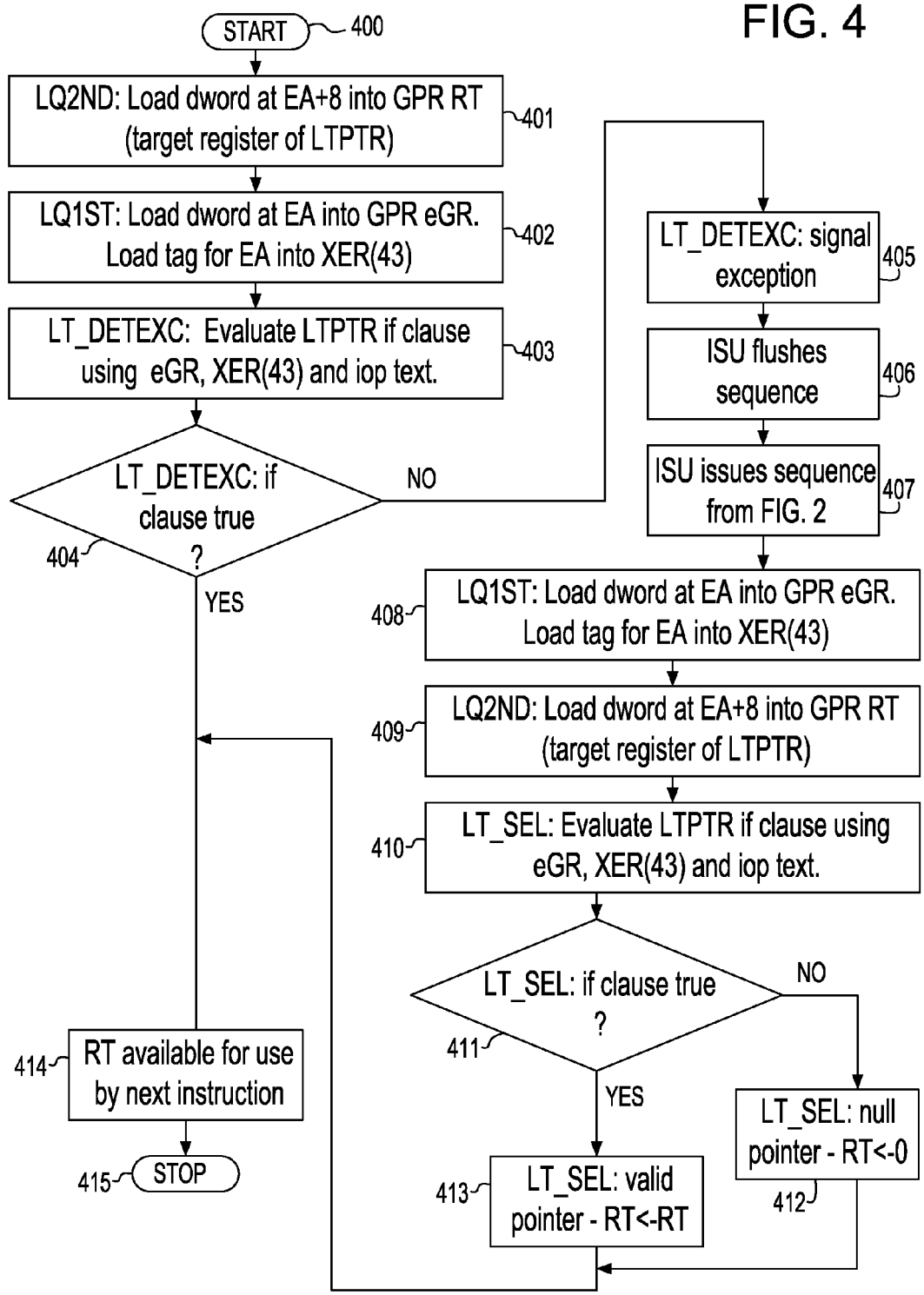
FIG. 4 depicts a logical flow of a speculative ltptr instruction execution with a two-cycle load-use latency according to an exemplary embodiment.

In a second exemplary embodiment, a logical flow is depicted in FIG. 4 for a speculatively executed ltptr instruction with a two-cycle load-use latency. As in the case of the 5-cycle load-use latency embodiment, the instruction decode logic cracks the ltptr instruction into three IOPS. However, in this case, LQ2ND IOP issues in the first cycle (ISS) to ensure that the LQ2ND instruction which loads the speculative result, i.e., the pointer, enters the issue queue first. Since the issue queue selects the first ("oldest") instruction available to executed first, this will ensure that the speculative pointer load instruction is issued and finishes first, thereby making the speculative result available at the earliest point in time.

As shown at step 401, LQ2ND loads the doubleword at EA+8 into target ltptr register GPR RT. The second iop, LQ1ST 402 loads the doubleword at EA into a scratch general purpose register eGR and loads the tag bit for the doubleword specified by EA into XER(43)—the fixed point exception register. The third iop, LT_DETEXC evaluates the original ltptr if statement described above. A recovery action is signaled at step 405 if RT should be set to the null pointer reflecting an invalid pointer having been loaded by the LTPTR instruction, which initiates a flush of the remaining instruction sequence for the ltptr instruction and any issued instructions dependent on the ltptr target register RT. The instruction sequence unit (ISU) then issues the 5-cycle load-use latency ltptr instruction depicted in FIG. 2, which is also described by steps 408 through 413 in FIG. 4. Conversely, when the if statement evaluates true, no flush operation occurs and no recovery is initiated.

Because the LT_DETEXC iop does not write the RT register, there is no dataflow dependence on the LQ1ST instruction and the LT_DETEXC instruction. Thus, successive instructions depending on the value of RT can issue and read the value of RT speculatively. If, at a later point, LT_DETEXC determines in accordance with step 405, that a recovery is necessary, the speculative sequence and all dependent instructions which may have read the speculative value of RT are flushed and re-executed.

Figure 5:
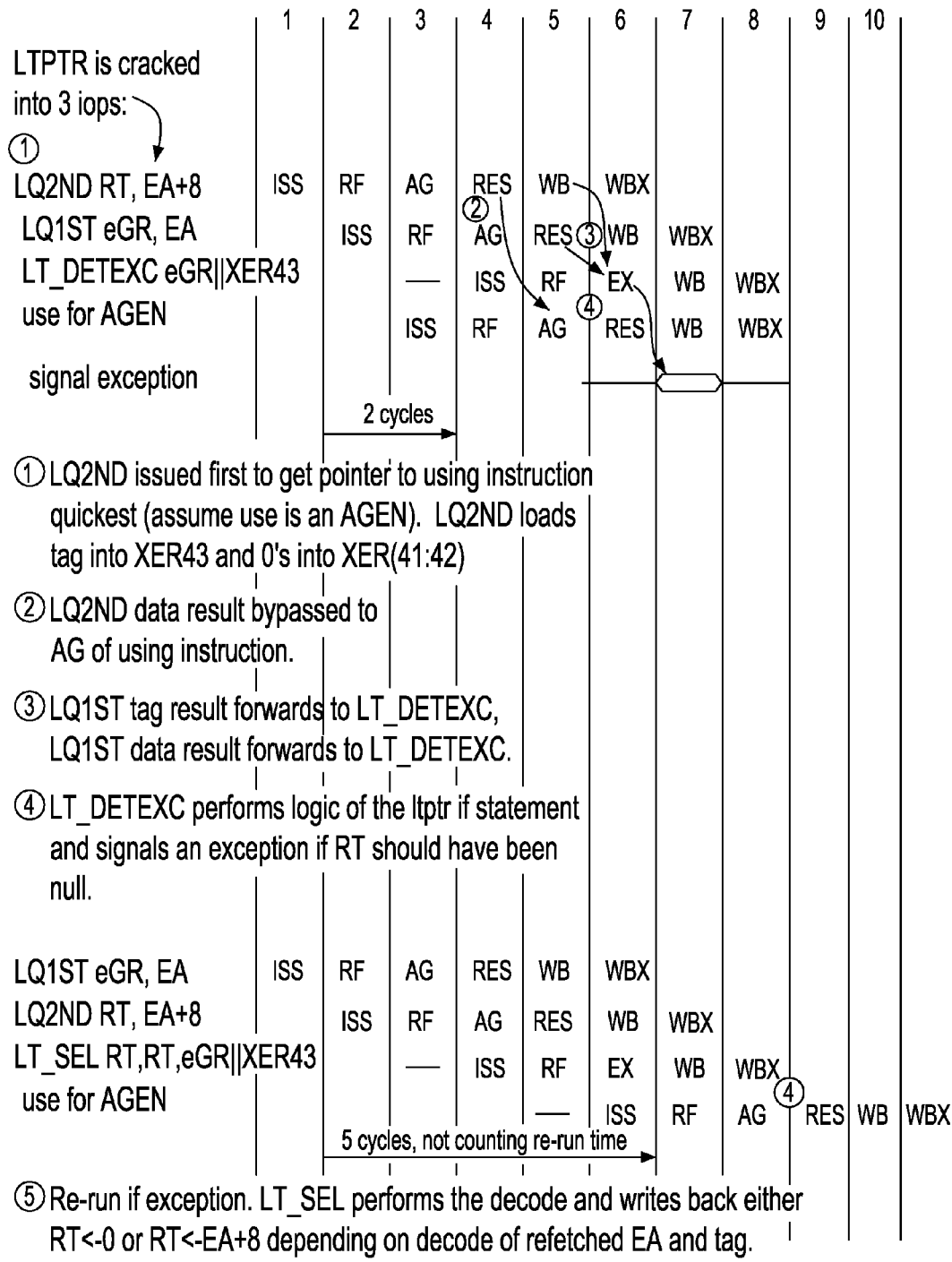
FIG. 5 illustrates an instruction pipeline sequence corresponding to the speculative ltptr instruction shown in FIG. 4.

Referring to FIG. 5, an instruction pipeline sequence of microinstructions associated with a ltptr instruction having a load use latency of two cycles is shown. The speculative embodiment shown in FIG. 5 exploits the fact that the else RT<=0 part of the ltptr if statement is infrequent. The else component of the instruction loads a null pointer into RT, however, the majority of ltptr executions load valid (i.e., non-null) pointers. The speculative ltptr embodiment also exploits the capability of certain microarchitectures to issue an instruction speculatively and discard it and subsequently-issued instructions dependent upon the speculatively-issued instruction should the speculation be invalid.

As in FIG. 3, the ltptr is cracked into a 3-iop sequence. The first two iops are the same as in FIG. 3, but their order has been interchanged to ensure that the LQ2ND is the earliest to execute instruction in the issue queue and so that the data returned from the LQ2ND in cycle 4 may be provided to a dependent instruction at the earliest possible cycle, i.e., cycle 5 in FIG. 5. When LQ2ND and an associated dependent instruction issue speculatively, it is assumed that LQ2ND will return a non-null pointer from the storage location at EA+8, wherein EA is the effective address specified as input to the dependent instruction using the output of the ltptr as its input with the lowest latency possible. The LQ1ST iop returns data from EA needed to determine if the speculative process is correct.

The LQ1ST iop fetches the data at MEM(EA) and tag that the LT_DETEXC requires to detect the exception. LT_DETEXC performs the logic of the ltptr if statement: if the result is true, no recovery is signaled; if it is false, an exception is signaled in cycle 7, initiating a flush of the instructions in progress and a non-speculative re-execution of the sequence. If no exception is detected, the load-use latency of the sequence is two cycles—the same as for an ordinary Load Doubleword (ld) instruction, i.e., a load instruction with no pointer validity checking whatsoever.

If a recovery condition/exception is detected, all results from the ltptr instruction and any instructions issued after it must be flushed and the ltptr must be re-executed this time to recover from the misspeculation. The exception is signaled in cycle 7 and causes a re-run of the ltptr. This time the ltptr is re-executed using the identical iop sequence shown in FIG. 3, which, although having a greater load-use latency, executes non-speculatively. The LQ1ST and LQ2ND iops issue in cycles 1 and 2, once again fetching the quadword of data specified by MEM(EA) and its associated tag. The refetch is necessary to ensure memory coherence because an interim store operation to EA may have changed the data and tag. LT_SEL issues in cycle 4, performing the speculative ltptr operation described previously, either preserving the data MEM(EA+8) written back to RT by LQ2ND or writing RT=0, i.e., the null pointer. In the event of an exception, the total latency penalty of re-execution is 5 cycles plus a variable number of cycles to flush the first ltptr.

In accordance with different embodiments of the present invention, the speculative sequence and the non-speculative recovery sequence can both be implemented using instruction cracking, or both sequences can be implemented using microcode, or one sequence can be implemented using instruction cracking and a second sequence can be implemented using microcode. Those skilled in the art will understand how to apply additional known and future ways of implementing sequences in accordance with the present invention.

Figure 6:
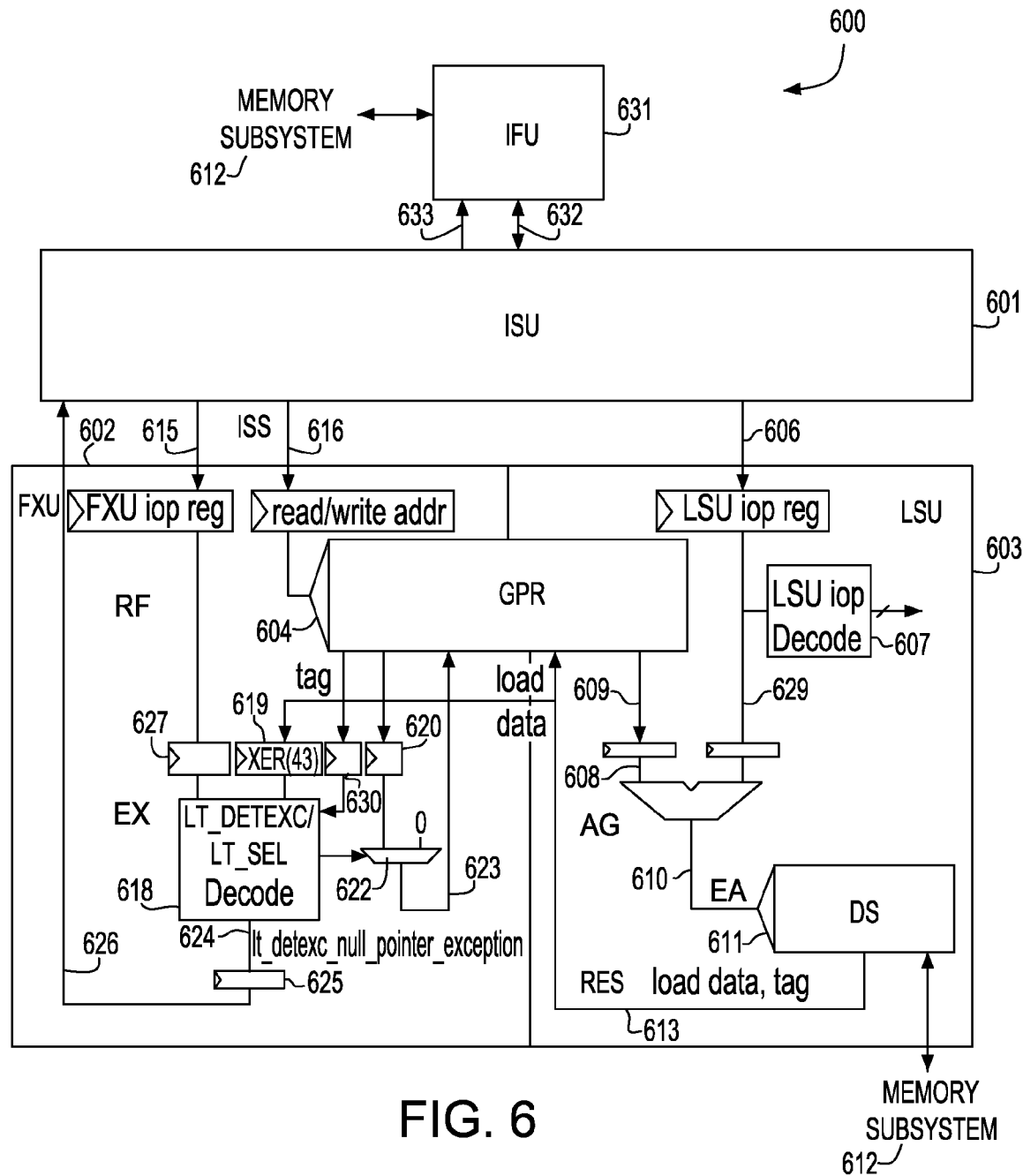
FIG. 6 depicts a functional block diagram of a microcomputer system, including an Instruction Fetch Unit (IFU), Instruction Sequencing Unit (ISU), Load/Store Add Unit (LSU) and a Fixed Point Unit (FXU) and associated signals and circuit elements necessary to implement an ltptr instruction according to the exemplar embodiments.

Referring to FIG. 6, and having reference also to FIG. 3 and FIG. 5, a functional block diagram is shown of an exemplary circuit embodiment 600 having a fixed point unit (FXU) 602 operatively coupled to an instruction sequencing unit (ISU) 601, a load/store unit (LSU) 603 and Instruction Fetch Unit (IFU) 631 operatively coupled to ISU 601. The IFU 631 fetches instructions from memory subsystem 612 or instruction cache within IFU 631, decodes, possibly cracks or microcodes instructions into a plurality of iops, and forms instruction groups prior to dispatch. A group contains a plurality of instructions or iops. At dispatch, a group is transferred from IFU 631 to ISU 601 on wires 632 and an entry in the ISU 601 completion table is allocated to the group, containing among other things, the finish status for each iop in the group and the address of the first instruction in the group. The completion table guarantees that instructions update the architected state, i.e. complete, in program order, if, and only if no flush conditions exist for any instruction in the group. Such conditions include, but are not limited to a mispredicted branch, interrupts or an ltptr exception signaling a null pointer. If such a condition exists for the group, the recovery process is initiated, comprising, among other things, the discarding of any speculative results in the general purpose registers (GPRs), de-allocating the entry in the completion table and requesting the IFU 631 on wire 633 to redispatch the group associated with the address of the first instruction of the discarded group. For the case of a flushed speculative ltptr, there is also an indication that the instruction should be re-dispatched in non-speculative form.

General purpose register (GPR) 604 is shared by both FXU and LSU. The LSU 603 further comprises LSU iop register 605 which latches an iop from the ISU 601 on wire 606 in the ISS cycle. LSU iop decode logic 607 decodes the iop to determine what actions the LSU must take for a given iop. Address generation logic 608 comprises registers for receiving source operands from the GPR 604 and the iop latched in register 605 on wires 609 and 629 respectively in the RF cycle and an adder for calculating and outputting the storage effective address on wires 610 to data cache (D$) 611 in the AG cycle. The data cache returns load data to the GPR 604 for writing to target register RT and scratch register eGR and tag to the fixed-point exception register XER(43) 619 on wires 613 in the RES cycle. One skilled in the art will understand the data cache provides these directly in the case of a cache hit or some number of cycles later from the attached memory subsystem 612 in the case of a cache miss. FXU 602 further comprises FXU iop register 614 which latches an iop from the ISU 601 on wire 615, and read/write addr register 617 which latches GPR read and write addresses from the ISU 601 on wires 616 in the ISS cycle. LT_DETEXC/LT_SEL decode logic 618 decodes the LT_DETEXC and LT_SEL iops to determine the validity of the pointer associated with a currently executed ltptr instruction loaded from effective address EA+8 and written into GPR RT by decoding XER(43) 619; the data loaded from effective address EA, written into scratch general purpose register eGR from whence it is read into register 630; and the several bits from the ltptr macro instruction carried in the iop and latched in register 627. LT_DETEXC/LT_SEL decode logic 618 reads the pointer from RT in GPR 604 into register 620, and, when the iop being processed is LT_SEL, controls multiplexer 623 to either copy target register RT back to itself in the case of a valid pointer, or write a 0 to RT in the case of a null pointer. In the event a null pointer condition is detected when processing an LT_DETEXC iop, the condition is asserted on lt_detexc_null_pointer exception 624, latched in latch 625, and asserted to ISU 601 on wire 626. In response to the assertion of lt_detexc_null_pointer exception 624, ISU 601 initiates a pipeline flush, requests a re-dispatch of the instruction group from the IFU 631 on wire 633, and the ltptr instruction is re-executed non-speculatively.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a computer system, a method of speculatively generating a tagged-pointer for a dependent instruction sequence dispatched from an instruction fetch unit, comprising:
   decomposing a load-tagged pointer (ltptr) instruction received from an instruction fetch buffer into three internal operations (iop);
   a first iop (LQ2ND) loading a first word from a first effective address (EA+8) of a first memory segment into a first (target) register associated with the ltptr instruction;
   a second iop (LQ1ST) loading a second word from a second effective address (EA) of the first memory segment into a second register and loading a tag bit associated with the second effective address into a first bit location of a third register; and
   a third iop (LT_DETEXC) evaluating the contents of the second register and the first bit location of the third register and signaling an exception for a null pointer.

2. The method according to claim 1 further comprising:
   flushing the dependent instruction sequence if a null pointer is detected;
   queueing the dependent instruction sequence for re-execution; and
   generating a non-speculative tagged-pointer using the following sequence:
   the second iop (LQ1ST) loads a third word from a third effective address (EA) of the first memory segment into the second register and loads a tag bit associated with the third effective address into a first bit location of a third register,
   the first iop (LQ2ND) loads a fourth word from a fourth effective address (EA+8) of a first memory segment into a first (target) register associated with the ltptr instruction and
   a fourth iop (LT_SEL) evaluates the contents of the second register and the first bit location of the third register and loading a zero in the first register if the pointer is null or rewriting the contents of the first (target) register back to the first register if the pointer is valid.

3. The method according to claim 2, wherein a location of the fourth effective address comprises a positive offset relative to the third effective address.

4. The method according to claim 3, wherein the positive offset of the fourth effective address relative to the third effective address comprises eight bytes.

5. The method according to claim 1, wherein a location of the second effective address comprises a negative offset relative to the first effective address.

6. The method according to claim 5, wherein the negative offset of the second effective address relative to the first effective address comprises eight bytes.

7. The method according to claim 1, wherein the first register comprises a target register associated with the ltptr instruction.

8. The method according to claim 1, wherein the first bit location comprises a bit of an exception register.

9. The method according to claim 8 further comprising writing back the tag bit to the exception register during a sixth clock cycle thereby completing processing of the second iop.

10. The method according to claim 1, wherein the third iop (LT_DETEXC) for evaluation further comprises checking whether bits from a doubleword stored at EA and a tag bit together with bits in the third iop instruction qualify the doubleword stored at EA+8 as a valid pointer.

11. The method according to claim 1, wherein the second register comprises a scratch general purpose register.

12. The method according to claim 1, wherein the first word and the second word each comprise a doubleword defined as twice a nominal length for the computer system.

13. The method according to claim 1, wherein the third register comprises an exception register.

14. The method according to claim 1, wherein the first and second iops are executed in parallel.

15. The method according to claim 1, wherein the ltptr instruction comprises a load use latency of two clock cycles.

16. The method according to claim 1, wherein the second iop loads a tag into an exception register to provide access by the dependent instruction sequence.

17. The method according to claim 1, wherein the first word loaded by the first iop is passed as an operand to a dependent instruction.

18. The method according to claim 2, wherein the ltptr instruction comprises a load use latency of five clock cycles.

19. The method according to claim 2, wherein a general purpose register file access operation loading the third word occurs within the same cycle as an issuance of the second iop.

20. The method according to claim 2 further comprising processing a storage address generation operation associated with the first iop during a third clock cycle.

21. The method according to claim 2 further comprising processing a general purpose file register access operation such that a fourth word is loaded from a fourth specified effective address (EA+8) into a ltptr target register (RT) during a third cycle.

22. The method according to claim 2 further comprising processing a cache access (RES) operation in a fourth clock cycle to load data and tag results returned to a fixed point unit for write back to the first register.

23. The method according to claim 22 further comprising evaluating in a sixth cycle an if statement using data from the cache access occurring in a fifth cycle.

24. The method according to claim 22, wherein a loaded tag result is forwarded to the fixed point unit by the second iop and the second word is forwarded to the FXU for processing by the third iop.

25. The method according to claim 2 further comprising issuing the third iop in a fourth clock cycle.

26. The method according to claim 2 further comprising writing back the third word fetched from the third effective address (EA) into a general purpose scratch register and tag bit associated with the third effective address into a first bit location of a third register during execution of the second iop while the first iop retrieves the fourth word from the fourth effective address (EA+8).

27. The method according to claim 26, wherein the second IOP performs a write back to the general purpose scratch register during a seventh clock cycle.

28. The method according to claim 2 further comprising processing a third register access operation associated with the third iop during a fifth cycle to provide tag bits for testing whether the tagged pointer is valid.

29. The method according to claim 2, wherein the first iop also writes back the fourth word from the fourth effective address (EA+8) to make available for the third iop.

30. A computer system comprising a central processing unit (CPU) coupled to a memory, said memory storing null and non-null pointers, said CPU further comprising:
an instruction fetch unit (IFU) capable of fetching instructions from said memory, decoding said instructions, and forming said instructions into instruction groups, and dispatching said instruction groups;
an instruction sequencing unit (ISU) capable of dynamically controlling a speculative execution of a plurality of instructions in said CPU, said ISU comprising:
an issue means for receiving said dispatched instruction groups and issuing instructions from said instruction groups;
a completion means allowing correct speculative instruction executions to update a CPU state and preventing incorrect speculative instruction executions from updating the CPU state;
a recovery means enabling said incorrect speculative instruction executions to be non-speculatively re-executed and any incorrect speculative instruction results to be discarded;
a fixed-point unit (FXU) responsive to instructions from said ISU to execute instructions;
a load/store unit (LSU) responsive to instructions from said ISU to fetch said pointers from said memory and speculatively store said pointers in a first register of the CPU; and
a decoding means responsive to instructions from said ISU for decoding said stored pointers to determine whether said pointer is null or non-null and signaling to said ISU when an incorrect speculative execution has stored a null pointer, said ISU invoking said completion means preventing said incorrect speculative execution from updating CPU state and recovery means to re-dispatch and re-execute said instructions from said ISU non-speculatively.

31. The system according to claim 30 wherein the decoding means is contained within the fixed-point unit.

32. The system according to claim 30 wherein the decoding means is contained within the load/store unit.

33. The computer system according to claim 30, wherein the decoding means determines whether a null address pointer has been detected and signals an exception to the ISU for the purpose of flushing the instruction sequence associated with a load tagged pointer instruction and re-executing the load tagged pointer instruction non-speculatively.

34. The computer system according to claim 30, wherein the completion means further comprises:
a completion table configured to track a status of issued instruction groups; and
a completion logic element configured to direct a refetch from an Instruction Fetch Unit (IFU) to dispatch when an instruction has generated an exception.

35. The computer system according to claim 30, wherein an exception comprises an interrupt, a mispredicted branch or a null pointer.

36. The computer system according to claim 30, wherein the recovery means further comprises:
a flush logic element configured to discard a currently executing instruction sequence when an exception is detected; and
a dispatch logic element capable of re-issuing the currently executing instruction sequence.

* * * * *